United States Patent
Brod et al.

(10) Patent No.: US 7,942,323 B2
(45) Date of Patent: May 17, 2011

(54) APPARATUS AND METHOD FOR TESTING THE READING RELIABILITY OF SMART LABELS

(76) Inventors: Volker Brod, Bad Abbach (DE); Henrik Bufe, Leipzig (DE)

( * ) Notice: Subject to any disclaimer, the term of this patent is extended or adjusted under 35 U.S.C. 154(b) by 253 days.

(21) Appl. No.: 12/093,895

(22) PCT Filed: Nov. 9, 2006

(86) PCT No.: PCT/EP2006/068290
§ 371 (c)(1),
(2), (4) Date: May 15, 2008

(87) PCT Pub. No.: WO2007/057343
PCT Pub. Date: May 24, 2007

(65) Prior Publication Data
US 2008/0272195 A1 Nov. 6, 2008

(30) Foreign Application Priority Data

Nov. 17, 2005 (DE) .......................... 10 2005 055 381
Feb. 17, 2006 (DE) .......................... 10 2006 007 423

(51) Int. Cl.
*G06K 7/00* (2006.01)
(52) U.S. Cl. ...................................................... 235/438
(58) Field of Classification Search .................. 235/435, 235/436, 438, 479, 492
See application file for complete search history.

(56) References Cited

U.S. PATENT DOCUMENTS

| 6,104,291 | A | 8/2000 | Beauvillier et al. |
| 6,972,394 | B2 * | 12/2005 | Brod et al. ............... 219/121.85 |
| 2004/0215350 | A1 * | 10/2004 | Roesner ........................... 700/1 |
| 2005/0150102 | A1 | 7/2005 | Bosco et al. |
| 2005/0159906 | A1 | 7/2005 | Tada |
| 2009/0230198 | A1 * | 9/2009 | Armijo et al. ................. 235/492 |

FOREIGN PATENT DOCUMENTS

WO WO2007057343 3/2007

OTHER PUBLICATIONS

Rao, K. V. S; Nikitin, Pavel v.; Lam, Sander F. "Impedance Matching Concepts in RFID Transponder Design" IEEE Workshop, p. 39-42 (Oct. 2005).

* cited by examiner

*Primary Examiner* — Seung H Lee
(74) *Attorney, Agent, or Firm* — John A. Miller; Miller IP Group, PLC

(57) ABSTRACT

The invention relates to an apparatus for testing the reading reliability of smart labels (3), comprising
  a reader (6),
  a transport device (2) arranged at a distance from the reader (6) for receiving and transporting the smart labels (3), and
  a device for adjusting the transmitting power of the reader (6),
  wherein the reader (6) has a reader antenna (7), the distance (d) of which from the transport device (2) can be varied.

12 Claims, 1 Drawing Sheet

APPARATUS AND METHOD FOR TESTING THE READING RELIABILITY OF SMART LABELS

PRIORITY CLAIM

Figure 1:
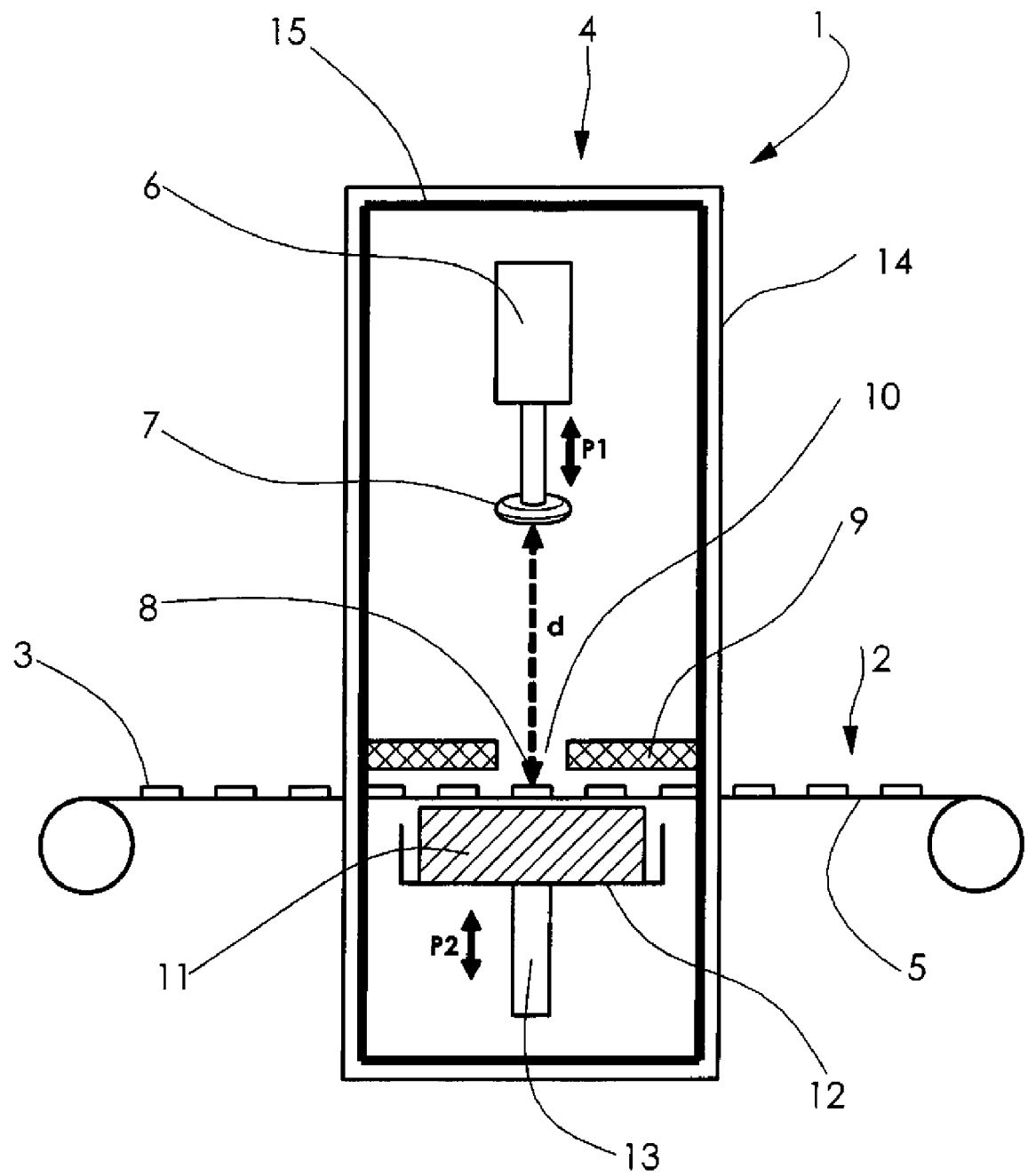

This application claims the benefit of PCT/EP2006/068290, the contents of which are hereby incorporated by reference.

The invention relates to an apparatus and a method for testing the reading reliability of smart labels.

Smart labels are known from the prior art. They usually have a coil-shaped antenna which is applied to a substrate, and a chip which is connected to the antenna. In order to protect the components, suitable cover layers are provided. Smart labels are very thin and are in practice offered for example in the form of self-adhesive labels.

One important selection criterion in the case of smart labels is the read/write range. This is also referred to as the reading reliability of smart labels. In order to be able to obtain information about the reading reliability, smart labels are tested with regard to their range.

A measurement apparatus is known which comprises a combined transmitting and receiving unit (the so-called reader) and an antenna which is connected to the reader. According to a standardised data protocol, the reader communicates in a contactless manner with the smart label to be tested which is arranged at a distance from the antenna.

The distance that can be reached for stable communication between the reader and the smart label is essentially determined by the transmitting power of the reader, the design of the antenna and the influences of the present surroundings (e.g. free-field, metallic surfaces, liquids, etc.) for the entire transmission path. If the smart label is attached to an object, the latter may also have an additional effect on the reading range, depending on features concerning high-frequency technology.

With the known measurement apparatus, the reading reliability of smart labels (already attached to the carrier) was tested by keeping constant the transmitting power of the reader and varying the distance between the smart label and the reader antenna. The transmitting power was for example 0.5 Watt.

The reading range, i.e. the range within which the smart label could still be read, was the measure of the reading reliability. The reading reliability was documented for each smart label.

One disadvantage of the known method is the time factor. It is complicated to move the smart labels over a relatively wide range in order to ascertain where communication stops. Furthermore, with the known test apparatus, problems arise with regard to the size of the test structure. Smart labels may have ranges of several metres, and therefore the test apparatus must have corresponding dimensions.

The object of the invention is, while eliminating the aforementioned disadvantages, to provide a test apparatus which is able to test smart labels with regard to their reading reliability in a manner that is faster and requires a less complex apparatus.

In order to achieve this object, the apparatus mentioned in the introduction comprises a reader, a transport device arranged at a distance from the reader for receiving and transporting the smart labels, and a device for adjusting the transmitting power of the reader, wherein the reader has a reader antenna, the distance of which from the transport device can be varied.

By means of the apparatus according to the invention, it is possible to carry out an advantageous presetting of the distance between the antenna and the smart label via the adjustable antenna in order firstly to adapt the wave propagation characteristic to the measurement arrangement. The wave minima and wave maximum of the respective field are important in this connection.

After setting the distance, the transmitting power is reduced in steps and the smart label is read in each case. The range within which the smart label can be reproducibly read (and optionally written to) determines the degree of reading reliability. By means of the method according to the invention, an increasing distance between the item to be tested and the transmitting/reading unit is simulated by decreasing the power level, and therefore this can also be referred to as "far-field simulation".

In principle, it may be provided that the entire reader (with the antenna) can be moved relative to the smart label. However, it is particularly advantageous if only the antenna can be moved relative to the smart label. This reduces the moved masses and thus increases the accuracy and speed of response.

Preferably, the transport device comprises a conveyor belt. The smart labels are transported on this conveyor belt into the test apparatus, are read (and/or written to) in the test apparatus and are guided out of the apparatus, where they can then be removed. Preferably, a stepping motor is provided for driving the conveyor belt, which may moreover run on rollers.

In the case of a test apparatus working in cycles as described above, care should be taken to ensure that a plurality of smart labels are not inadvertently read at the same point in time. This falsifies the measurement result. Advantageously, therefore, a shield is provided which ensures that the reader communicates only with one smart label. The other smart labels which have already been read or which are next in line are shielded. The shield will be arranged at a suitable distance from the smart labels. A small distance has proven to be advantageous.

It has already been indicated above that the (subsequent) carrier material of the smart label may also have an effect on the reading range, i.e. the reading reliability. It is thus desirable to obtain a value for the reading reliability also of the "finished" product. In one important further development of the invention, a base element which cooperates with the smart label is arranged on the side of the respective smart label which is the opposite side to that of the reader. The base element can be coupled to the smart label, wherein advantageously the reading reliability of the complete module can be determined.

Preferably, the distance between the base element and the smart label can be varied.

The base element may be the subsequent carrier itself. However, it may also be provided that the base element corresponds to that object to which the smart label will (subsequently) be applied. It is particularly advantageous if the physical properties of the base element correspond to that object to which the smart label will be attached.

Another critical factor for the measurement accuracy is also the surroundings, which may give rise to undesirable interfering radiation. In order to increase the measurement accuracy, it is therefore proposed that at least the antenna and the smart label to be tested are arranged in a chamber of the measurement apparatus which is high-frequency-damped (HF-damped) relative to the surroundings. The chamber may be formed by a measurement chamber which has HF-damping absorbent material at least on its inner side. The outer walls are advantageously made of metal.

One preferred embodiment of the invention is characterised in that the reader is also arranged within the measurement chamber.

According to the invention, the object is also achieved by a method for testing the reading reliability of smart labels, wherein at least one smart label is transported into a measurement apparatus which has a reader and an antenna coupled thereto, the distance between the antenna and the reader is preset in a first step, and wherein in a second step the transmitting power of the reader is reduced while maintaining the preset distance of the antenna.

The smart labels tested by the method according to the invention can be classified according to the determined reading sensitivity. This means that, for each smart label, the determined level can be defined as a number which can be used to deduce the reading range of the smart label.

Preferably, the smart labels are transported in steps into the measurement apparatus. This ensures a rapid and continuous test sequence.

A high throughput is ensured by the fact that a plurality of smart labels are guided into the measurement apparatus one behind the other, wherein in each case only one smart label is written to or read and the others are shielded.

As already explained above, the carrier material of the smart label may also have an effect on the reading range of the smart label. In this connection, it is regarded as advantageous that a base element which cooperates with the smart label is pushed under the smart label. The distance between the smart label and the base element can preferably be varied.

In one further development of the invention, it is proposed that firstly a smart label is tested without the base element and then the smart label is tested with the base element. As a result, the difference in the reading sensitivity with and without the base element can be assessed and optionally influenced by suitable measures.

The invention will be explained in more detail below with reference to a preferred example of embodiment in connection with the appended drawing, in which:

FIG. 1 shows an apparatus according to the invention for testing the reading reliability of smart labels.

FIG. 1 shows an apparatus 1 for testing the reading range of smart labels. By means of a transport device 2, the individual smart labels 3 are transported through a measurement chamber 4. This takes place in steps via a conveyor belt 5. The smart labels 3 are therefore tested in a step-by-step method, wherein the smart labels are stationary during the respective reading and/or writing process itself and are further transported once the test is complete. This results in a high throughput while at the same time achieving a good measurement reliability.

The apparatus 1 according to the invention comprises a reader, i.e. a reading/writing unit 6, which is coupled to a reader antenna 7. The antenna 7 can be moved in the direction of the arrow P1. As a result, the distance d from the smart labels can be set, as will be explained in further detail below.

The reader 6 serves for transmitting an HF signal (high-frequency signal) to the respective smart label 8 to be tested and optionally for receiving the signals output by the smart label. According to the invention, the transmitting power of the signals is adjustable. In this way, it is possible to simulate a different distance between the antenna 7 and the smart label 8.

According to the invention, in a first step the distance d between the antenna and the smart label 8 to be tested is set, namely so as to adapt the wave propagation characteristic (minima and maxima of the HF wave) to the measurement arrangement. In a second step, the transmitting power of the reader 6 is reduced in steps and thus an increasing distance between the antenna 7 and the smart label is simulated.

In order to avoid interference, a shield 9 is arranged in such a way that only the smart label 8 to be tested communicates with the antenna. The shield 9 may be designed like a diaphragm with an opening 10. Depending on the application, the size of the opening 10 may be adjustable.

A base element 11 is arranged below the conveyor belt 5. This base element preferably corresponds in terms of its properties to the object on which the smart label will subsequently be arranged. The base element 11 is held by a support device 12, wherein the distance from the smart label can be varied by means of an adjustment device 13 as illustrated by the arrow P2. By means of the base element 11, it is possible to simulate later conditions already during the measurement.

The measurement chamber 4 has side walls 14 made of metal which are lined with an absorbent material 15. The absorbent material serves to dampen UHF waves. In this way, it is possible to prevent external interference which falsifies the measurement result.

LIST OF REFERENCES 1 apparatus
2 transport device
3 smart labels
4 measurement chamber
5 conveyor belt
6 reader
7 antenna
8 smart label to be tested
9 shield
10 opening
11 base element
12 support device
13 adjustment device
14 side walls
15 absorbent material

The invention claimed is:

1. An apparatus for testing the reading reliability of smart labels, comprising:
   a reader;
   a transport device arranged at a distance from the reader for receiving and transporting the smart labels;
   a device for adjusting the transmitting power of the reader, wherein the reader has a reader antenna, the distance from the transport device is variable; and
   a base element which cooperates with the smart label is arranged on a side of the smart label being tested which is the opposite side to that of the reader and the distance between the base element and the smart label to be tested is variable, wherein physical properties of the base element correspond to an object to which the smart label will be applied.

2. The apparatus according to claim 1, wherein the antenna is moveable relative to the reader.

3. The apparatus according to claim 1, wherein the transport device comprises a conveyor belt.

4. The apparatus according to claim 3, further comprising a shield arranged such that the reader communicates only with one of the smart labels to be tested.

5. The apparatus according to claim 4, wherein the base element shape corresponds to an object to which the smart label will be attached.

6. The apparatus according to claim 1, further comprising a chamber, wherein at least one of the antenna and the smart label to be tested are arranged in the chamber which performs high-frequency-damping relative to an area surrounding the chamber.

7. The apparatus according to claim 6, wherein the chamber includes a HF-damping absorbent material disposed on an inner side of the chamber.

8. A method for testing the reading reliability of smart labels, the method comprising:
- transporting at least one smart label to be tested into a measurement apparatus which has a reader and an antenna coupled thereto,
- presetting the distance between the antenna and the smart label to be tested,
- reducing transmitting power of the reader while maintaining the preset distance of the antenna, and
- pushing a base element which cooperates with the smart label to be tested under the smart label to be tested, wherein physical properties of the base element correspond to an object to which the smart label is to be applied.

9. The method according to claim 8, wherein the smart labels are transported in steps into the measurement apparatus.

10. The method according to claim 9, wherein transporting comprises:
- guiding a plurality of the at least one smart labels into the measurement apparatus one behind the other, further comprising:
- testing only one smart label at a time, wherein testing includes one of writing to or reading; and
- shielding the other smart labels.

11. The method according to claim 8, wherein the distance between the smart label to be tested and the base element is variable.

12. The method according to claim 8, further comprising: first testing the smart label to be tested without the base element and then testing the smart label to be tested is tested with the base element.

* * * * *